May 7, 1929.  J. F. ENGLE  1,711,837

TIRE VALVE DUST CAP

Filed June 11, 1925

INVENTOR
JOHN F. ENGLE
BY
*A. E. Merkel,*
ATTORNEY.

Patented May 7, 1929.

1,711,837

UNITED STATES PATENT OFFICE.

JOHN F. ENGLE, OF LAKEWOOD, OHIO, ASSIGNOR OF ONE-FIFTH TO WILLIAM J. MULHOLLAND, OF CLEVELAND, OHIO.

TIRE-VALVE DUST CAP.

Application filed June 11, 1925. Serial No. 36,374.

My invention relates to dust caps adapted to exclude dust, mud, water and other foreign matter from the valve nipple which is attached to the inner tube of an automobile tire, although it will be understood that it may be applied to any similar device from which it is desired to exclude dust or any other extraneous matter.

The object of the invention is to provide a dust cap which may be attached or detached quickly, which will perform its function in an efficient manner and which may be economically manufactured.

Said invention consists of a construction hereinafter fully described and particularly pointed out in the claims.

The annexed drawing and the following description set forth in detail certain means embodying my invention, the disclosed means, however, constituting but one of various mechanical forms in which the principle of the invention may be employed.

Figures 2, 3:
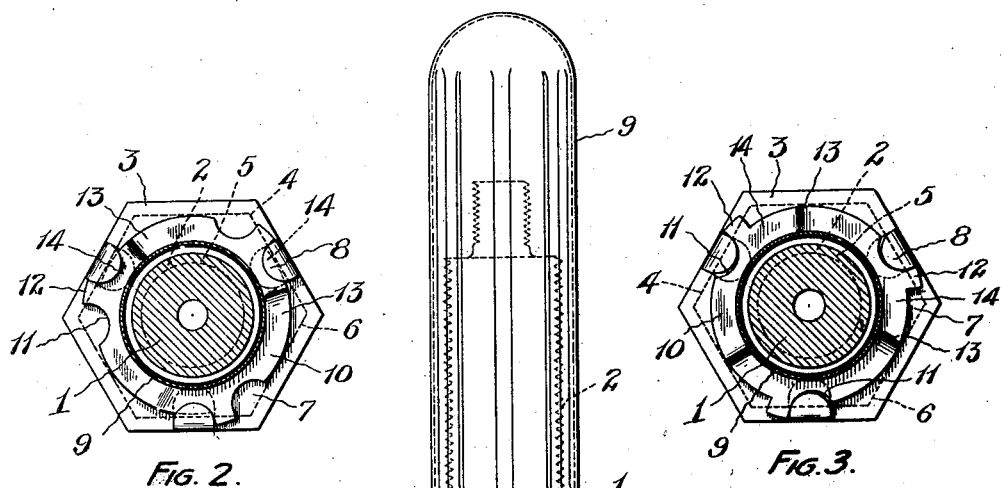
Fig. 2 represents a section taken on the plane indicated by line II—II in Fig. 1.
Fig. 3 represents a section similar to that of Fig. 2, showing the parts in a different position.

The nipple 1 is of the usual form and provided with the exterior threads 2. Seated upon and engaging the threads of this nipple is a nut 3 which, in conjunction with the gasket 4, Fig. 4, makes the required connection between the wheel felloe and the nipple.

The said nut 3 is preferably pressed out of sheet metal and is formed with the threads 5 engaging the nipple threads 2, and with the lower recess 6 which receives the gasket or washer 4. The flange 7 of the nut is struck up to form a plurality of inwardly extending hook-like projections 8. In the illustrated device, the number of these projections is shown as three.

The dust cap proper 9 is of the usual general tubular form but devoid of interior threads and its inner end is formed with an outwardly extending flange 10. This flange is provided with marginal incisions or recesses 11, corresponding in number with and circumferentially spaced to conform with the spacing of the projections 8. These recesses are of such size as to permit the flange, when its recesses and the projections are alined, to pass the projections 8 as shown in Fig. 3. Adjacent to each of these incisions is an outwardly extending projection or stop 12 formed on and in the general plane of said flange, the extent of these projections being such that they may be caused to engage the projections 8 and prevent rotation of the nipple.

Figure 1:
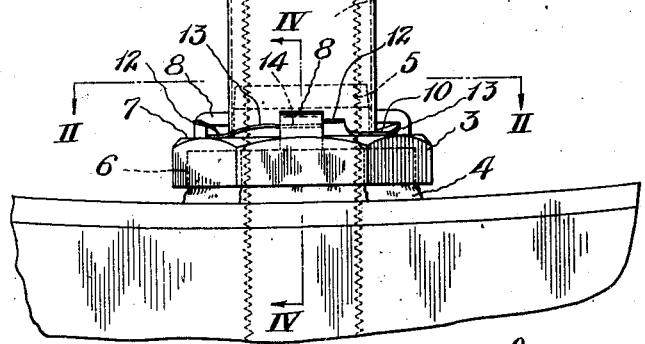
Figure 1 represents an enlarged side elevation of a dust cap construction embodying my invention, showing also a portion of the wheel felloe to which the tire which includes the valve nipple, is secured.

The portions of the flange intermediate of the successive incisions 11 are raised out of the plane of flange 10 as shown at 13, Fig. 1, to form depressions 14. These raised portions extend from the incisions in a gradual incline as shown, and then drop to the depressions 14.

In applying the above-described device, the cap is slipped down over the nipple without engaging the threads 2, the inner diameter of such cap being large enough for this purpose. The cap is then turned so as to bring the projections 8 and incisions 11 into alinement, and then pressed down so as to cause said incisions to pass the projections, whereupon the cap is turned clockwise, causing the flange portions 13 to engage the inner surfaces of the projections 8. Such engagement will cause the flange portions 13 to flex and permit the projections to pass into the depressions 14, after which further rotation is prevented by the engagement of the projections 12 with the projections 8 as shown in Figs. 1 and 2. In this position, the cap is locked against inadvertant rotation such as might be effected during rotation of the wheel in its ordinary normal use on the vehicle. The amount and degree of flexing is determined by the rise of the portions 13 and the thickness of the metal of the flange 10 as to insure the prevention of such inadvertant removal, as will be readily understood.

Figures 4, 6:
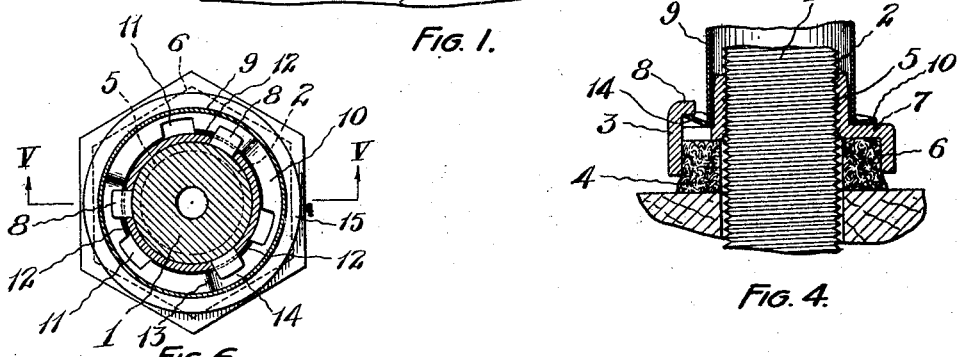
Fig. 4 represents a fragmentary axial section taken upon the plane indicated by line IV—IV in Fig. 1.
Fig. 6 represents a section taken upon the plane indicated by line VI—VI in Fig. 5.
Figure 5:
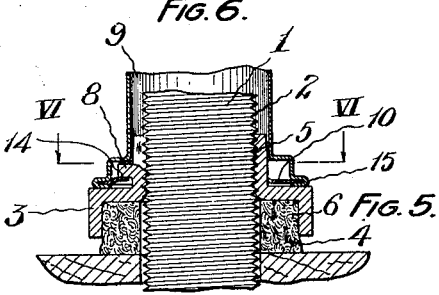
Fig. 5 represents a section similar to that of Fig. 4, showing a modified form.

Figs. 5 and 6 illustrate a modification of the above described device. In this case the projections 8 are caused to extend outwardly, and the inner end of the cap is provided with an inwardly extending flange 10. In this construction it is preferable to make this flange a separate piece as shown, secured by means of a bead 15.

This modified form, therefore, is in all respects similar in its general construction to that first described and is operated in exactly the same manner.

What I claim is:

1. The combination with a nut member adapted to engage a tire-valve nipple and provided with a plurality of radial inwardly-extending hook-like projections; of a dust-cap provided with an outwardly projecting flange at its open end, said flange being formed with a plurality of circumferential incisions and radially projecting stops, one such stop being located adjacent to the side of each such incision, the latter being spaced to conform with the spacing of said hook-like projections, the material lying between the successive incisions and stops being flexible and raised out of the plane of the dust-cap flange and throughout a part only of the length of such material, whereby depressions are formed adjacent to said stops, the ends of the material adjacent to the incisions and said stops lying substantially in the plane of said flange.

2. The combination with a nut member adapted to engage a tire-valve nipple, said member being provided with a plurality of spaced radial projections forming locking elements; of a dust-cap member adapted to fit over the nipple and provided with a flange, said flange being bent to provide a plurality of resilient locking elements corresponding to said locking elements on said nut and adapted for engagement therewith to secure said cap in place on said nut.

3. The combination with a nut member adapted to engage a tire-valve nipple; of a dust-cap member, said nut member being provided with radial projections and the dust-cap member being provided with a flange formed with incisions spaced to conform with the spacing of and to receive said projections, and with a plurality of radial stop projections corresponding in number to the said incisions, the material intermediate of the successive stop projections and the incisions being flexible and raised out of the plane of said flange, such raised portions terminating short of said stop projections to form depressions, whereby in turning one member while the other is held stationary, such raised portions are caused first to engage and then disengage the under sides of the said first-named radial projections.

Signed by me this 9th day of June, 1925

JOHN F. ENGLE.